Feb. 10, 1953 V. T. PARÉ 2,627,628
MOLDING CUSHION
Filed Aug. 25, 1949
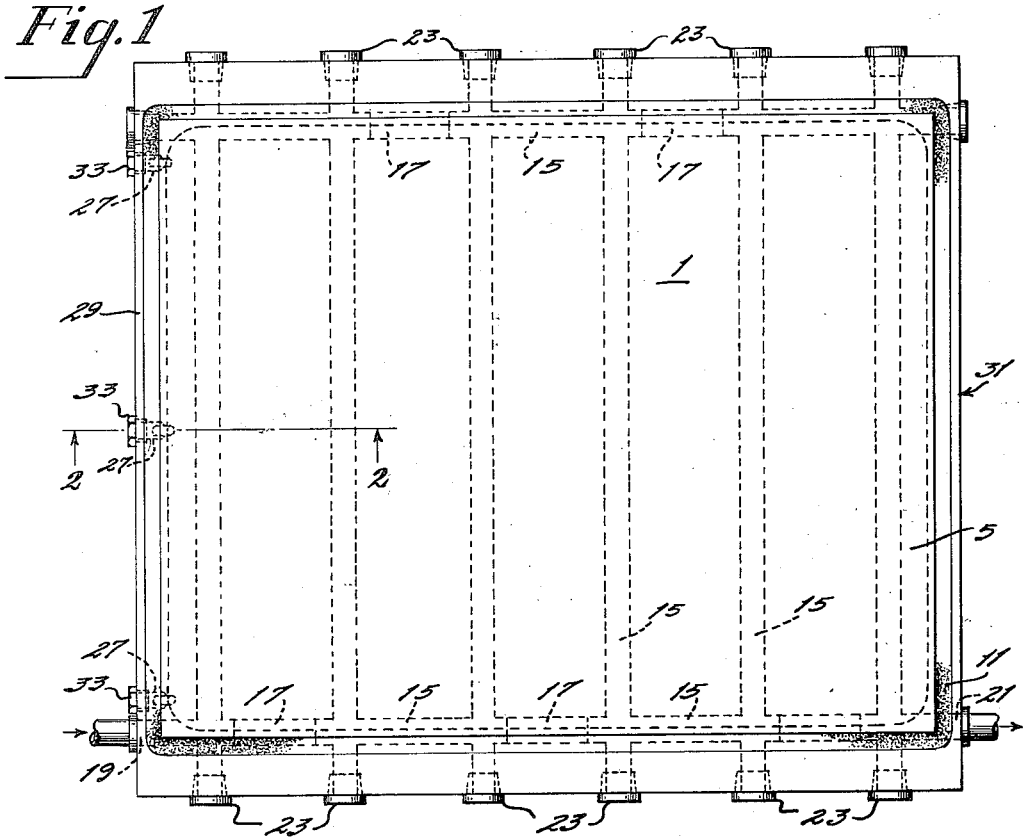
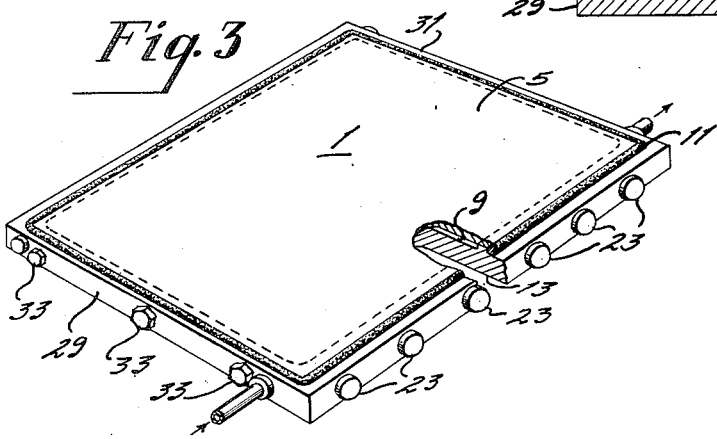
INVENTOR
*Victor T. Paré*
BY
ATTORNEY Patented Feb. 10, 1953

2,627,628

UNITED STATES PATENT OFFICE 2,627,628

MOLDING CUSHION

Victor T. Paré, Westmont, N. J., assignor to Radio Corporation of America, a corporation of Delaware Application August 25, 1949, Serial No. 112,220

3 Claims. (Cl. 18—17)

This invention relates to molding apparatus, and more particularly to an improved molding cushion which is particularly useful in molding thermoplastic materials.

In commercial molding of thermoplastic materials, it has been found necessary to cushion the mold plates from the heated mold platens. In some apparatus, numerous compressible materials such as rubber, mixtures of rubber and cork, woven asbestos, cotton flannel, etc. are interposed between the mold plate and the mold platen to provide a degree of resilience necessary to accommodate moldable materials of non-uniform density. With such arrangements the transfer of heat to the moldable material must penetrate through the cushion and the mold plate. In other systems, such as that disclosed by E. Anderson in his U. S. Patent No. 1,854,498, dated April 19, 1932, a hydraulic pad is employed which comprises a closed container filled with a liquid, preferably oil or water, and wherein the wall or mold plate of the container contacting the material to be molded is pliable. Irrespective of the advantages claimed for these prior art devices, difficulties are encountered with the cushion materials, some having a short life, others being poor mediums for transfer of heat, and, in most cases, the molding apparatus will not maintain a constant and uniform pressure on the article to be molded because of the expansion and contraction characteristics of the cushion materials.

The primary object of my present invention is to provide a molding cushion which will overcome the above as well as other disadvantages of prior art molding cushions.

It is also an object of my present invention to provide a molding cushion which is suitable for heat transfer without having to compensate for the coefficient of expansion characteristics of the cushion material.

It is a further object of my present invention to provide an improved molding cushion which will have a much higher efficiency of heat transfer to the material to be molded, and one which will enable a constant and uniform pressure to be applied during the molding process without the use of complicated pressure adjusting mechanisms.

A still further object of my present invention is to provide an improved molding cushion which is simple and easy to construct, and which can be manufactured without difficulty at a minimum of cost.

In accordance with my present invention, I provide a mold platen comprising a thick metal plate having a milled recess provided on one side thereof. A relatively thin diaphragm constituting a mold plate, which is readily pliable, covers the milled recess to provide an enclosed cavity or chamber. The enclosed cavity or chamber is filled with a cushion material having the physical characteristics of a low melting point and good heat conductivity. The cushion material found desirable for this purpose is a eutectic alloy which exhibits physical characteristics more significantly related to the objects of my present invention, such, for example, as a low coefficient of expansion in passing from the molten to the solid state and vice versa, and a low coefficient of expansion with time after solidification. In order to apply heat to the molding cushion thereby to melt the cushion material and to transfer heat through the mold plate to the material to be molded, a circuitous passage is provided in the body of the thick metal plate through which hot fluid may be circulated. Inlet and outlet ports are also provided in the plate, which communicate ports with opposite ends of the passage thereby to permit entry and withdrawal of hot or cold fluids, the latter for cooling the assembly when desired.

The novel features of my present invention, as well as additional objects and advantages thereof, will be better understood from the following detailed description of one embodiment thereof, when read in connection with the accompanying drawing, in which:

Figure 1 is a plan view of a mold platen in accordance with my present invention, Figure 2 is a fragmentary side view, in section, taken along the line 2—2 of Figure 1 and showing the cavity filler hole and plug, and Figure 3 is a perspective view of the mold platen shown in Figure 1, being partly broken away to show the cavity behind the diaphragm.

Referring more particularly to the drawing wherein similar reference characters designate corresponding parts throughout, there is shown a mold platen 1 having a milled recess 3 provided in one side or face thereof. A relatively thin diaphragm 5 of suitable material such, for example, as spring steel, is disposed over the milled recess 3, having the peripheral edges thereof secured to the side walls 7 of the milled recess 3 to form a closed cavity or chamber 9. While any suitable securing means may be employed, it is found preferable to use a weld fillet 11 around the edge which is not only able to withstand pressure but which will also provide an excellent seal for the chamber 9.

The main body portion 13 which forms one of the walls of the cavity 9 and which is disposed opposite the diaphragm 5 is drilled or otherwise provided with a plurality of internal passages 15. The passages 15 are interconnected and have plugs 17 suitably arranged in the passages to provide a circuitous path throughout the body portion 13 of the mold platen 1. An inlet port 19 and an outlet port 21 are provided in opposite edges of the body portion 13, communicating these ports with opposite ends of the circuitous passage 15 thereby to permit entry and withdrawal of fluid mediums such as steam, hot or cold water, or other suitable fluids, for the purpose of heating or cooling the mold platen 1 and the cushion material 11. In the event the passages 15 are drilled in the body portion 13 from the edges thereof, it will, of course, be necessary to seal the ends of the passages to prevent escape of the fluid material when circulated through the circuitous passages 15 and 17. For this purpose, plugs 23, or other suitable means, are provided.

The cavity or chamber 9 is completely filled with a suitable cushion material 25 which will readily conform itself during the molding process to any irregularities in the surface of the material to be molded due to uneven packing, or other causes, and thereby permit a uniform and constant pressure to be applied at all points on the material to be molded. For this purpose, I have found that certain relatively low melting point eutectic alloys possess the necessary qualities to provide an efficient and suitable cushion. In order to facilitate filling the chamber 9 with the cushion material 25, filler holes 27, which communicate with the chamber 9, are provided along one edge 29 of the mold platen 1.

While any suitable method may be employed to fill the chamber 9 with the cushion material 25, great care should be exercised to insure that the chamber contains no voids or contamination of any kind, and that the chamber is completely filled. In this respect, one method which has been found suitable is as follows: (1) thoroughly clean the members forming the chamber or cavity 9 prior to securing the diaphragm 5 to the cavity walls 7; (2) after the diaphragm 5 is secured in place, support the mold platen 1 on the edge 31 thereof opposite the filler holes 27; (3) heat the mold platen 1 to the melting temperature, or to a temperature slightly above the melting temperature, of the alloy cushion material 25; (4) fill the chamber 9 with molten alloy cushion material 25 until it overflows the filler holes 27; and (5) finally plug each filler hole 27 tightly with a suitable plug 33, such as a pipe plug.

A particular feature of my present invention is concerned with the cushion material 25 with which the chamber 9 is filled. It is necessary to the efficient operation of the apparatus that this material have certain properties, such as (1) a low coefficient of expansion in passing between the molten and the solid states; and (2) a low coefficient of expansion with time after solidification of the material during the cooling process. In addition thereto, it is also found desirable that the cushion material 25 have a relatively low melting point and that it should not be susceptible to corrosion. In general, it may be stated that a cushioning material which has a melting point not substantially in excess of 300° F. is satisfactory for most molding operations encountered in practice.

Examples of materials which possess the properties above mentioned, and which have been found particularly suitable as a cushion material for mold apparatus of the type described herein, are: (1) an alloy consisting essentially of a mixture of 58% lead and 42% tin and having a melting point at about 281° F.; (2) an alloy consisting essentially of a mixture of 42.5% bismuth, 37.7% lead, 11.3% tin, and 8.5% cadmium and having a melting point of about 165° F.; and (3) an alloy consisting essentially of a mixture of 55.5% bismuth and 44.5% lead, and having a melting point at about 255° F. All three of these alloys have a substantially zero coefficient of expansion in passing between the molten and the solid states, and also have a substantially zero coefficient of expansion with time after solidification. Of these three alloys, that which I have found most suitable is number 1, since it has the lowest coefficient of expansion in passing between the molten and solid states, as well as the lowest coefficient of expansion with time after passing from the molten to solid state. Although these three alloys are given as examples, it is conceivable that there may be others having the same physical characteristics, and, therefore, it is desired that my present invention shall not be limited to the use of these materials.

The operation of the apparatus is as follows: the diaphragm 5 of the mold platen 1 is placed in contact with the material to be molded; heat is then applied to the mold platen 1 through the circuitous passages 15 to effect heating of the mold platen 1; heat is transferred to the alloy until it becomes molten and thereby forms a fluid cushion 25 behind the diaphragm 5; the heat conducted through the diaphragm 5 is transmitted directly to the material to be molded; and heating is then continued for the period of time necessary to effect proper molding. After molding is complete, cooling of the mold and the molded article is effected by passing a cooling fluid through the passages 15 whereupon, at a sufficiently lowered temperature, the alloy and hence the molded material will become solidified.

It is obvious from this process that, when the alloy is in its fluid state, the flexible diaphragm 5 will conform itself readily to any surface irregularities in the material to be molded and that uniform pressure will be maintained over the entire surface of the article being molded during the cooling process. Inasmuch as the alloy possesses such a low coefficient of expansion in passing between the molten and solid states, as well as a low coefficient of expansion with time after solidification, there will be no necessity to compensate for any change in pressure from that originally applied directly by the molding apparatus, as would ordinarily occur if other cushioning materials having a higher coefficient of expansion were used.

It will be apparent, from the foregoing description, that since all of the elements of my molding cushion possess excellent qualities of heat transfer, and since the flexible diaphragm which is a part of the mold platen is in direct contact with the material to be molded, an effective, efficient, and rapid transfer of heat is applied under uniform pressure to the material to be molded.

While I have shown and described but one modification of my improved molding cushion, it will be obvious to those persons skilled in the art that other modifications and changes are possible within the spirit of my invention. Therefore, I desire that the particular form of my in-

What is claimed is:

1. In a molding apparatus, a mold platen having a recess defined by rigid walls in one face thereof, a diaphragm of relatively thin flexible material secured to the walls defining said recess thereby defining a completely sealed chamber in said platen, a cushion comprising an alloy completely filling said chamber, said alloy being characterized by having a substantially zero co-efficient of expansion in passing between the molten and the solid states, and said alloy being characterized further by having a substantially zero co-efficient of expansion with time after solidification thereof, whereby said cushion may accommodate a heating of said platen during a part of a molding process followed by a chilling of said platen.

2. A molding apparatus according to claim 1 wherein said mold platen includes a body portion having a circuitous passage disposed therewithin on the side of said chamber opposite said diaphragm, said body portion being provided with inlet and outlet ports communicating with opposite ends of said passage thereby to permit entry and withdrawal of fluid mediums for alternately heating and cooling said mold platen to thereby alternately melt and solidify said alloy cushion.

3. The invention as set forth in claim 1 wherein said alloy comprises a mixture of approximately 55.5% bismuth and 44.5% lead.

VICTOR T. PARÉ.

REFERENCES CITED

The following references are of record in the file of this patent:

UNITED STATES PATENTS

| Number | Name | Date |
|---|---|---|
| 280,745 | Hyatt | July 3, 1883 |
| 1,854,498 | Anderson | Apr. 19, 1932 |
| 2,018,736 | Norris | Oct. 29, 1935 |
| 2,138,620 | Strange | Nov. 29, 1938 |
| 2,364,597 | Atwood | Dec. 12, 1944 |
| 2,372,114 | Perry et al. | Mar. 20, 1945 |
| 2,431,926 | Fairbank | Dec. 2, 1947 |